United States Patent
Tan et al.

(10) Patent No.: US 10,251,211 B1
(45) Date of Patent: Apr. 2, 2019

(54) VEHICLE CONNECTION MAINTENANCE SYSTEM

(71) Applicant: Nissan North America, Inc., Franklin, TN (US)

(72) Inventors: Adrian Tan, Northville, MI (US); Rami Daman, West Bloomfield, MI (US); Luke Blaszczynski, Commerce Township, MI (US); Adam Saganski, Farmington Hills, MI (US); Mohammad Sous, Dearborn Heights, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/947,497

(22) Filed: Apr. 6, 2018

(51) Int. Cl.
*H04W 76/25* (2018.01)
*H04W 48/04* (2009.01)
*B60N 2/00* (2006.01)
*H04W 4/80* (2018.01)
*H04W 4/48* (2018.01)

(52) U.S. Cl.
CPC ............ *H04W 76/25* (2018.02); *B60N 2/002* (2013.01); *H04W 4/48* (2018.02); *H04W 4/80* (2018.02); *H04W 48/04* (2013.01)

(58) Field of Classification Search
CPC ......... H04W 76/25; H04W 4/48; H04W 4/80; H04W 48/04; B60N 2/002
USPC ..................................................... 455/456.1
See application file for complete search history.

(56) References Cited

U.S. PATENT DOCUMENTS

| | | | |
|---|---|---|---|
| 2010/0197359 A1 | 8/2010 | Harris | |
| 2011/0224870 A1 | 9/2011 | Tan | |
| 2013/0168503 A1* | 7/2013 | Cooper | B61L 15/0027 246/167 R |
| 2014/0248863 A1 | 9/2014 | Golsch | |
| 2014/0341188 A1* | 11/2014 | Chang | H04W 4/06 370/331 |
| 2017/0093866 A1* | 3/2017 | Ben-Noon | H04L 9/3234 |
| 2017/0215219 A1* | 7/2017 | Burger | H04W 4/046 |
| 2017/0238174 A1* | 8/2017 | Cech | H04W 4/80 455/411 |
| 2017/0316254 A1* | 11/2017 | Hariri | B60R 25/24 |
| 2018/0234844 A1* | 8/2018 | Lavi | H04W 12/06 |

* cited by examiner

*Primary Examiner* — Mong-Thuy T Tran
(74) *Attorney, Agent, or Firm* — Global IP Counselors, LLP (57) ABSTRACT

A vehicle connection maintenance system includes a receiver, a transmitter, an electronic controller. The receiver is disposed in a vehicle and is configured to receive a signal from a portable device to enable the portable device to wirelessly connect to a connection system in the vehicle. The transmitter is disposed in the vehicle and is configured to transmit information related to the portable device. The electronic controller is configured to the cause the transmitter to transmit information when the receiver has received the signal from the portable device and the portable device is connected to the connection system of the vehicle to maintain wireless connection between the portable device and the connection system of the vehicle and prevent the portable device from wirelessly connecting to a remote system, the information indicating that the portable device is wirelessly connected to the connection system in the vehicle.

18 Claims, 7 Drawing Sheets

VEHICLE CONNECTION MAINTENANCE SYSTEM

BACKGROUND

Field of the Invention

The present invention generally relates to a vehicle connection maintenance system. More specifically, the present invention relates to a vehicle connection maintenance system configured to maintain a portable device wirelessly connected or wired to a system of a predetermined vehicle.

Background Information

Conventional bluetooth connection systems can pair a vehicle audio system to a portable device. In these bluetooth connection systems, after the first pairing, the subsequent connections are performed automatically when the vehicle is started and the portable device is determined to be in range. In some bluetooth connection systems, the system includes a preferred list to determine which portable device to connect to and when the first preferred portable device is not connected, the bluetooth connection systems will automatically connect to the second or a subsequent preferred portable device, when in range. In some bluetooth connection systems, the system can connect to multiple devices.

SUMMARY

Due to this limited system, bluetooth connection systems can connect to portable devices when connection is not needed and disconnect portable devices when connection is still needed. Specifically, a situation exists where a user has paired a portable device to two vehicles or systems (e.g., a first (host) vehicle and a second (remote) vehicle) in the past. A portable device is connected to or disposed in a desired (first) vehicle and during travel or in another situation becomes positioned relative to the second vehicle or system. As the user approaches the second vehicle or system, the portable device can jump to connect with or attempt to connect with the second vehicle.

It has been discovered that an improved connection system is needed. In view of the state of the known technology, one aspect of the present disclosure is to provide a vehicle connection maintenance system that includes a receiver, a transmitter, an electronic controller. The receiver is disposed in a vehicle and is configured to receive a signal from a portable device to enable the portable device to wirelessly connect to a connection system in the vehicle. The transmitter is disposed in the vehicle and is configured to transmit information related to the portable device. The electronic controller is configured to the cause the transmitter to transmit information when the receiver has received the signal from the portable device and the portable device is wirelessly connected to the connection system of the vehicle to maintain wireless connection between the portable device and the connection system of the vehicle and prevent the portable device from wirelessly connecting to a remote vehicle, the information indicating that the portable device is wirelessly connected to the connection system in the vehicle.

Another aspect of the present disclosure is to provide a vehicle connection maintenance system, that includes an external server, a remote receiver, a vehicle receiver, a vehicle transmitter, and an electronic controller. The remote receiver is connected to the external server. The vehicle receiver is disposed in a vehicle and is configured to receive a signal from a portable device to enable the portable device to wirelessly connect to a connection system in the vehicle. The vehicle transmitter is disposed in the vehicle and is configured to transmit information related to the portable device to the remote receiver. The electronic controller is configured to the cause the vehicle transmitter to transmit information to the remote receiver when the vehicle receiver has received the signal from the portable device and the portable device is wirelessly connected to the connection system of the vehicle to maintain wireless connection between the portable device and the connection system of the vehicle and prevent the portable device from wirelessly connecting to a remote vehicle, the information indicating that the portable device is wirelessly connected to the connection system in the vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
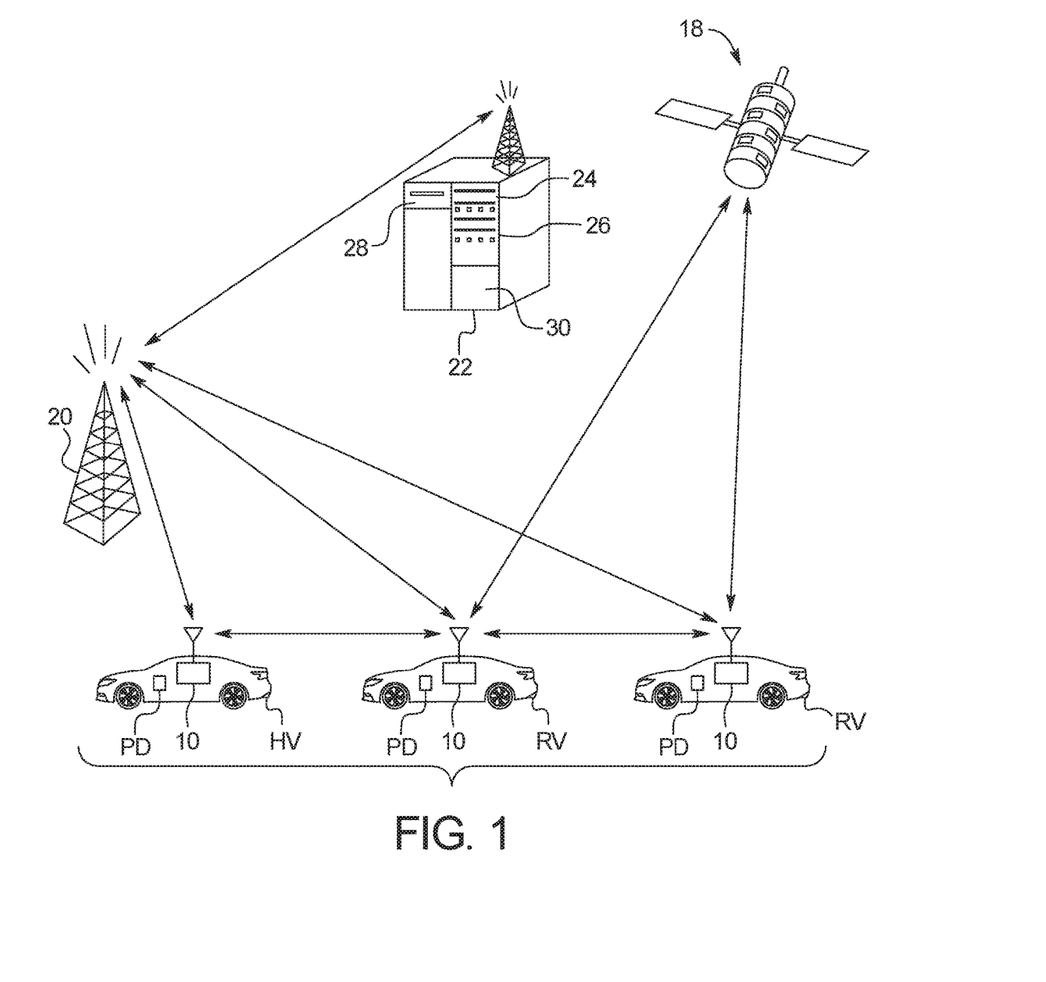
FIG. 1 is a block diagram illustrating an example of a vehicle equipped with a vehicle connection maintenance system according to embodiments disclosed herein in relation to remote vehicles bus and components of a wireless communication network.
Figure 2:
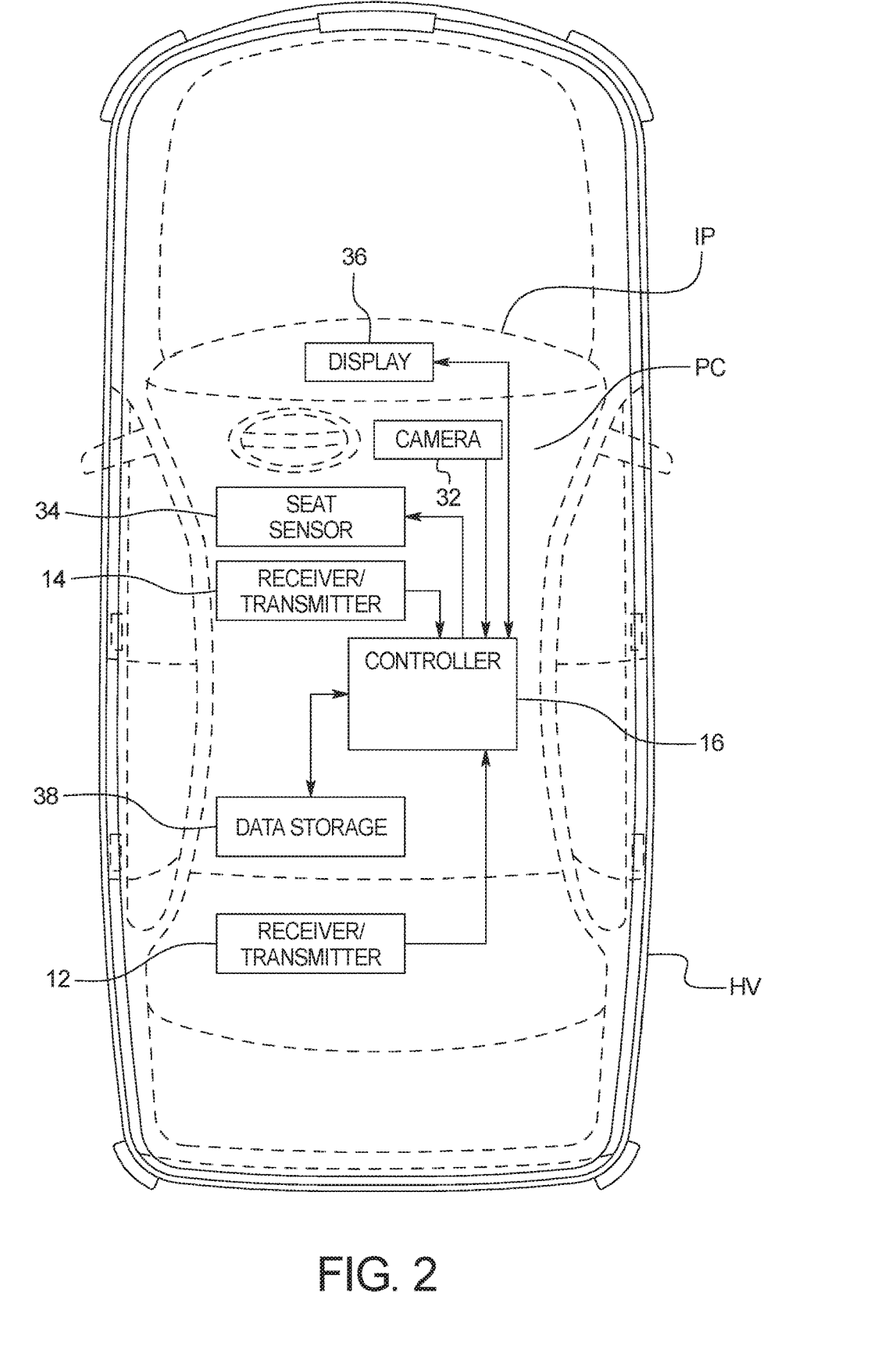
FIG. 2 is a schematic view of an example of a vehicle equipped with a vehicle connection maintenance system according to embodiments disclosed herein.
Figure 3:
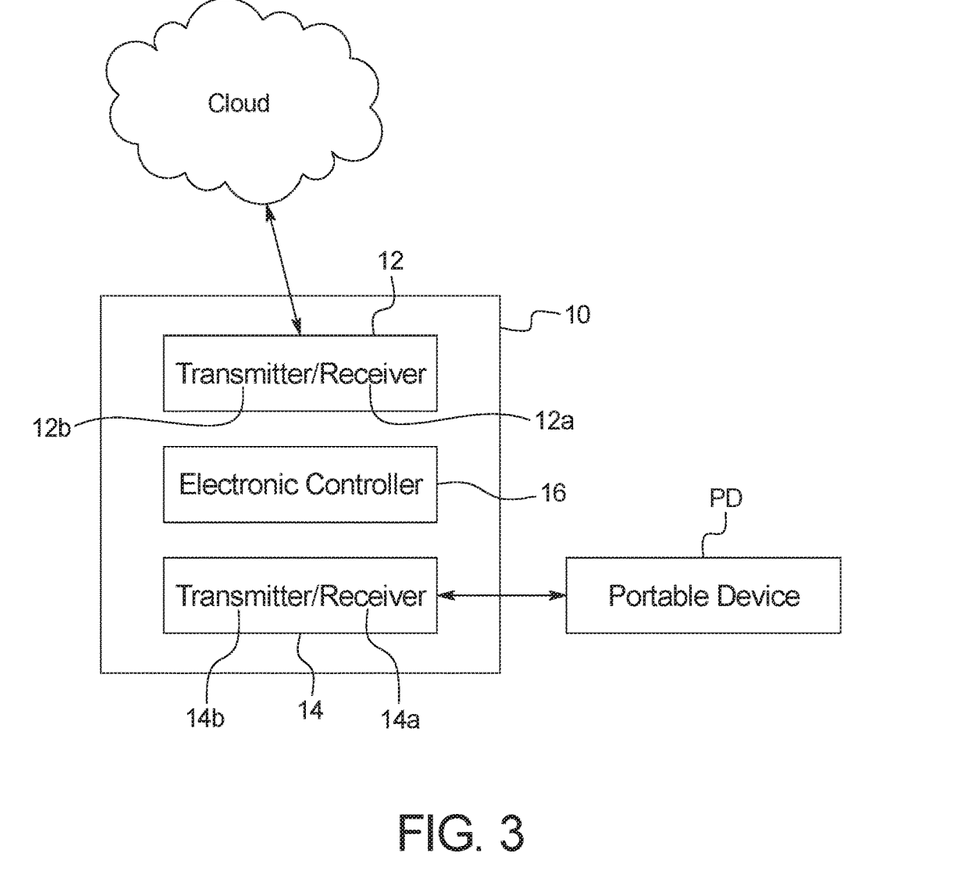
FIG. 3 is a schematic view of an example of a vehicle connection maintenance system in communication with the internet.

Referring initially to FIGS. 1-3, a vehicle connection maintenance system 10 is illustrated in accordance with an embodiment. The vehicle connection maintenance system 10 can includes first receiver/transmitter 12, a second receiver/transmitter 14, an electronic controller 16, a camera 32, a sensor 34, and a display 36. It is noted that although the first receiver/transmitter 12 and the second receiver/transmitter 14 are separate systems, they can be the same system.

The vehicle connection maintenance system 10 of a host vehicle HV and a remote vehicle RV (or remote system) can communicate with a two-way wireless communications network. As can be understood, the present vehicle connection maintenance system 10 is not limited to prevention of only a remote vehicle RV, but also any type of connection system whether mobile or stationary. Thus, the remote vehicle RV can be considered a mobile remote system.

As seen in FIG. 1, for example, the two-way wireless communications network can include one or more global navigation satellites 18, and one or more terrestrial units, such as a roadside (terrestrial) unit 20, and a base station or external server 22. The global navigation satellites 18 and the roadside units 20 send and receive signals to and from the first receiver/transmitter 12 of the host vehicle HV and the remote vehicle HV. The external server 22 sends and receives signals to and from the first receiver/transmitter 12 of the host vehicle HV and the remote vehicle HIV via a network of the roadside units 20, or any other suitable two-way wireless communications network, including a WIFI network, or other suitable network when the host vehicle HV or remote vehicle RV is positioned relative and in range of such a network, for example in the garage of a home or in a parking lot adjacent a WIFI network.

The external server 22 can include a transmitter 24, a receiver 26, an electronic controller 28 and a storage device 30. As discussed above, the transmitter 24 and the receiver 26 of the external server 22 enable the external server 22 to send and receive signals to and from the first receiver/transmitter 12 of the host vehicle HV and the remote vehicle HV via a network of the roadside units 20, or any other suitable two-way wireless communications network. Moreover, the electronic controller 28 includes a processor, such as a microcomputer, with a control program that controls the external server 22 as discussed herein. The processor can be part of a microcomputer. The controller 28 can also include other conventional components such as an input interface circuit, an output interface circuit, and storage devices, such as a ROM (Read Only Memory) device and a RAM (Random Access Memory) device. The internal RAM of the controller 28 can store statuses of operational flags, various control data and so on, and the internal ROM of the controller 28 can store the control program and any information for the various operations described herein as understood in the art.

The controller 28 is operatively coupled to the transmitter 24, the receiver 26, and the storage device 30 and the other types of equipment on the external server 22 in any suitable manner as understood in the art and is programmed to monitor and control these components as discussed herein. The storage device 30 can also store processing results and control programs that are run by the controller, such as processing results and control programs for the external server 22, the transmitter 24, the receiver 26 and any other suitable information. The storage device 30 can also store information received from another vehicle (not shown), and from any other entity as discussed herein or as would be understood by one skilled in the art.

Referring initially to FIGS. 2 and 3, a vehicle connection maintenance system 10 for the host vehicle IIV is illustrated in accordance with one embodiment. It is noted that while the description of the vehicle connection maintenance system 10 is discussed as being included in the host vehicle HV, any description of the vehicle connection maintenance system 10 can be applicable to the remote vehicle RV. That is, as can be understood, the remote vehicle can include a vehicle connection maintenance system 10 as described herein. As discussed above, the vehicle connection maintenance system 10 includes the first receiver/transmitter 12, the second receiver/transmitter 14, the electronic controller 16, the camera 32, the sensor 34, and the display 36. It is noted that the vehicle connection maintenance system 10 can include some or all of these components.

The electronic controller 16 includes a processor, such as a microcomputer, with a control program that controls the host vehicle HV as discussed herein. The processor can be part of a microcomputer. The controller 16 can also include other conventional components such as an input interface circuit, an output interface circuit, and storage devices (data storage 38), such as a ROM (Read Only Memory) device and a RAM (Random Access Memory) device. The internal RAM of the controller 16 can store statuses of operational flags, various control data and so on, and the internal ROM of the controller 16 can store the control program and any information for the various operations described herein as understood in the art.

The controller 16 is operatively coupled to the first receiver/transmitter 12, the second receiver/transmitter 14, the camera 32, the display 36 and the sensor 34 and the other types of equipment on the vehicle in any suitable manner as understood in the art and is programmed to monitor and control these components as discussed herein. The data storage 38 can also store processing results and control programs that are run by the controller 16, such as processing results and control programs for the vehicle connection maintenance system 10, the first receiver/transmitter 12, the second receiver/transmitter 14, the camera 32, the display 36 and the sensor 34, and any other suitable information. The data storage 38 can also store information received from another vehicle (not shown), and from any other entity as discussed herein or as would be understood by one skilled in the art.

The display 36 can be disposed on the instrument panel IP in the passenger compartment PC of the host vehicle HV as shown in FIG. 2, to provide visual information to occupants of the host vehicle HV as discussed below. The display 36 can be any suitable type of display such as an LCD screen, a touch panel, a flat screen display, a heads-up display, a window display, and so on as understood in the art. The display 36 is capable of displaying information from the electronic controller 16. For example, in one embodiment, the display 36 can display the connectivity between a system in the host vehicle HV and a portable device PD. Moreover, the display 36 can display notifications of remote vehicles RV within range of the portable device PD, or any other suitable information.

The sensor 34 can be disposed at suitable locations within the passenger compartment PC, such as at the steering wheel, at the seats and so on as understood in the art. The sensor 34 is in communication with the controller 16 and thus controlled by the controller 16 as discussed herein. As shown in FIG. 2 in one embodiment, the sensor 34 is a seat sensor that is configured to determine whether an occupant or user is disposed in the seat. However, as can be understood the sensor 34 can be any suitable sensor configured to determine whether an occupant or user is disposed within the passenger compartment PC of the host vehicle IHV. In some embodiment, the sensor 34 can be a camera, a micro phone array or any other suitable device. That is, the sensor 34 can be disposed to determine whether an occupant or user is disposed in any area (and not necessarily the driver seat) of the host vehicle HV.

The first receiver/transmitter 12 is preferably the system that communicates with the two way wireless communication network discussed above. The first receiver/transmitter 12 is configured to send information to the external server 22, the cloud C or internet and portable devices PD. The first receiver/transmitter 12 can send and receive information in any suitable manner, such as data packets. The first receiver/transmitter 12 can send and receive information from the two way wireless communication network, directly to other vehicles (e.g., remote vehicles RV) or in a suitable manner. When communication with other vehicles, the information can be sent directly to the remote vehicle, when in range, or through blockchain. Blockchain communication could be encrypted information that is sent from the host vehicle HV to the remote vehicle RV through other vehicles or portable device PD. The electronic controllers of the other vehicles or portable device PD would serve as the blocks of the chain between the host vehicle HV and the remote vehicle RV to prevent unintended disconnection/connection.

Moreover, the first receiver/transmitter 12 can send information as text messages, for receipt by remote or portable devices PD, such as smartphones, notebooks, tablets and so on used by the occupants of the vehicle or by people outside of the vehicle or to other vehicles, as understood in the art.

The first receiver/transmitter 12 includes, for example, a receiver 12a and a transmitter 12b configured as individual components or as a transceiver, and any other type of equipment for wireless communication. For example, the first receiver/transmitter is configured to communicate wirelessly over one or more communication paths. Examples of communication paths include a cellular telephone network, a wireless network (Wi-Fi or a WiMAX), a DSRC (Dedicated Short-Range Communications) network, a power line communication network, etc. The first receiver/transmitter 12 is configured to receive information from external sources and to transmit such information to the controller 16. For example, the first receiver/transmitter 12 can communicate with another vehicle, or any other suitable entity via a communication network (not shown), direct communication, or in any suitable manner as understood in the art.

The second receiver/transmitter 14 can include, for example, a receiver 14a and a transmitter 14b configured as individual components or as a transceiver, and any other type of equipment for wireless communication. The second receiver/transmitter 14 is preferably a bluetooth communication system configured to connect portable device PD, such as smartphones, notebooks, tablets and so on to systems, such as audio system and/or a display system, in the host vehicle HV or remote vehicle RV. However, it is noted that the second receiver/transmitter 14 can be any small area network configured to connect a portable device PD to a system of the host vehicle HV. As can be understood, the second receiver/transmitter 14 enables a portable device PD to transfer the functions and audio visual inputs and output of the portable device PD to the systems of the host vehicle HV. In some embodiment, the second receiver/transmitter 14 also enables control of aspects and systems of the host vehicle HV from the portable device. For example, radio or audio controls, communication controls or any other suitable vehicle systems controls can be performed by the second receiver/transmitter 14 communicating with the portable device PD and transferring this information to and from the controller 16.

Figure 4:
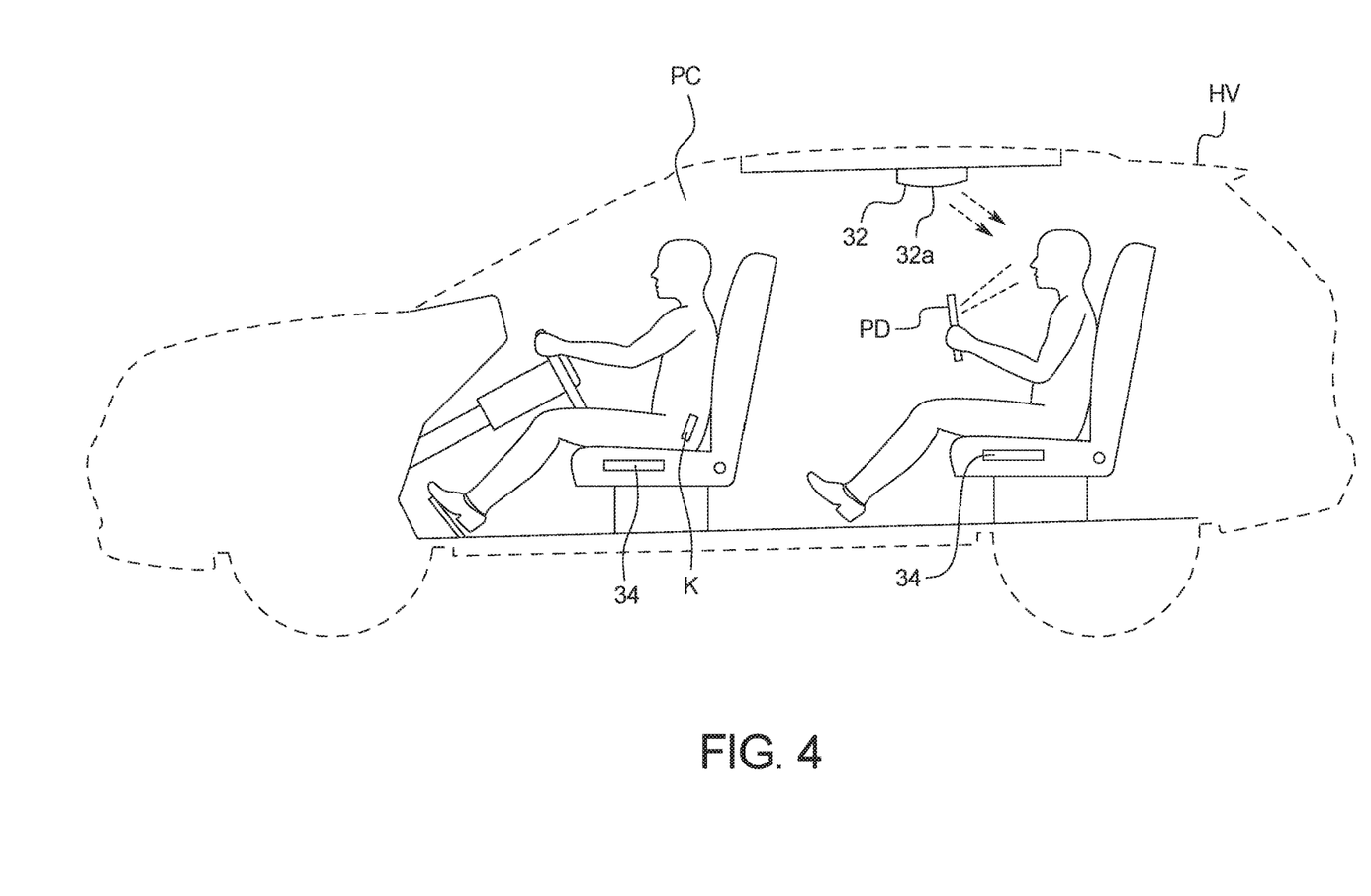
FIG. 4 is a partial interior view of the passenger compartment of a vehicle equipped with a vehicle connection maintenance system according to embodiments disclosed herein.

FIG. 4 illustrates is a partial interior view of the passenger compartment PC of a host vehicle HV equipped with a vehicle connection maintenance system 10 according to embodiments disclosed. Here both a driver and a passenger are illustrated. In one embodiment, when the host vehicle HV is started, the second receiver/transmitter 14 (i.e., the booth tooth system) searches for a portable device PD with which it has previously paired. As can be understood, in some embodiments the second receiver/transmitter 14 will search for devices saved in the data storage 38 and a list of preferred portables devices will be searched. When one of the portable devices in the list of stored devices is detected the second receiver/transmitter 14 connects the portable device PD to a system (e.g., the audio and/or display system) of the host vehicle HV.

The controller 16 then causes the first receiver/transmitter 12 to transmit information to the external server 22 via the two way communication network. The information including information related to the specific portable device PD and the specific host vehicle HV and that the specific host vehicle HV and the specific portable device PD are in communication with each other via the second receiver/transmitter 14 of the host vehicle HV. The external server 22 saves this information to a storage device 30 and transmits this information to a remote vehicle RV via the two way communication network.

Figure 5:
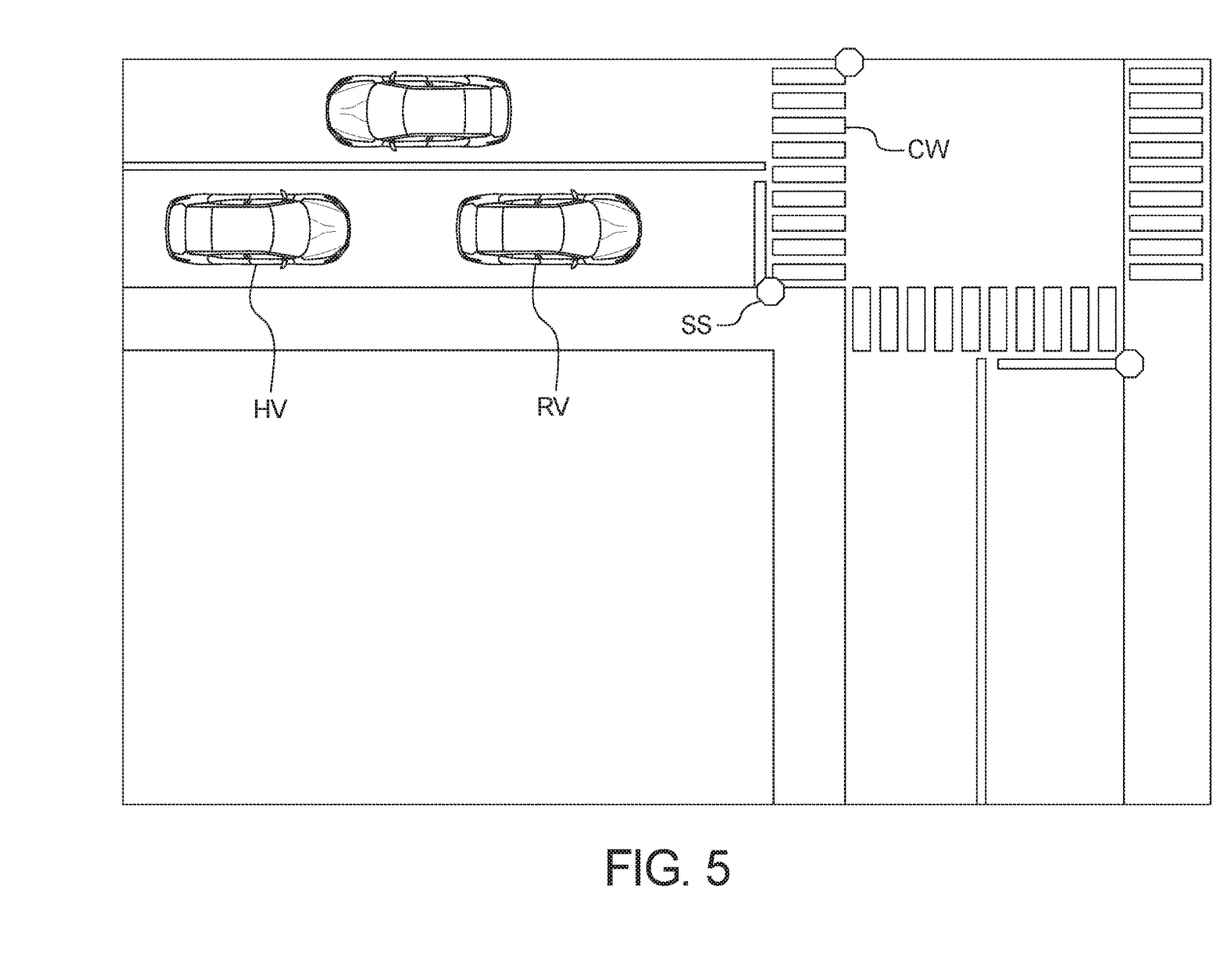
FIGS. 5 and 6 are exemplary diagrams illustrating different scenarios that are handled by the vehicle connection maintenance system according to disclosed embodiments.

Turning to FIG. 5, this figure illustrates a situation in which a remote vehicle RV is positioned at a stop sign SS or is stopped at a cross walk CW for a pedestrian. The host vehicle HV is approaching the remote vehicle RV from the rear. As can be understood, the portable device PD (FIG. 4) is connected to a system of the host vehicle HV as described above. Moreover, the remote vehicle RV is a vehicle to which the portable device PD has previously connected, and the portable device PD is thus listed in the data storage 38 of the remote vehicle RV as a preferred portable device PD to which to connect. As the host vehicle IV approaches the remote vehicle RV the portable device PD comes within range of detection by the remote vehicle RV second receiver/transmitter 14. However, since the remote vehicle RV has received information from the external server 22 that the host vehicle HV is connected to portable device PD, the remote vehicle RV connection maintenance system 10 prevents or prohibits the second receiver/transmitter 14 from connecting to the portable device PD.

It is noted that while this situation is discussed as receiving and sending information from the external server 22, the host vehicle HV can send the information directly to the remote vehicle RV in any suitable manner, as discussed herein, for example, vehicle to vehicle communications.

Figure 6:
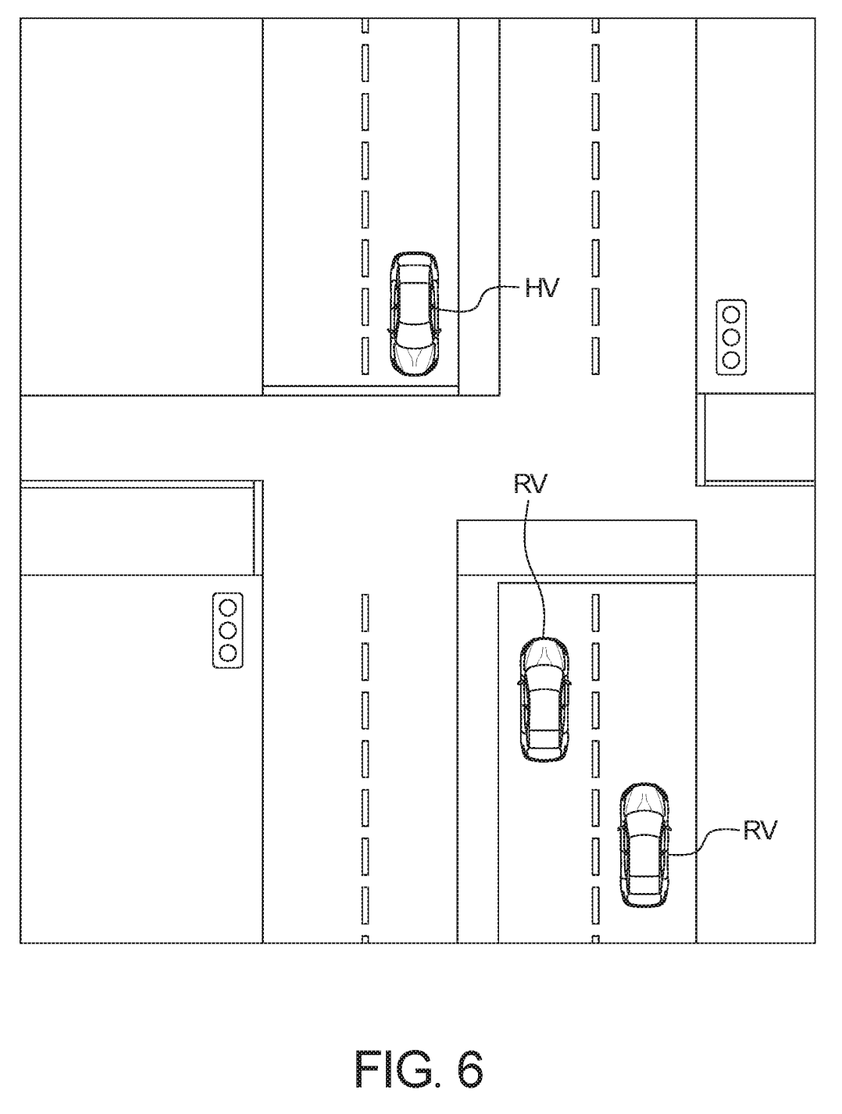

Turning to FIG. 6, this figure illustrates a situation in which a remote vehicle RV is approaching the host vehicle HV from the opposite direction. As can be understood, the portable device PD (see FIG. 4) is connected to a system of the host vehicle HV as described above. Moreover, the remote vehicle RV is a vehicle to which the portable device PD has previously connected, and the portable device PD is thus listed in the data storage 38 of the remote vehicle RV as a preferred portable device PD to which to connect. As the host vehicle IIV approaches the remote vehicle RV the portable device PD comes within range of detection by the remote vehicle RV second receiver/transmitter 14. However, since the remote vehicle RV has received information from the external server 22 that the host vehicle HV is connected to portable device PD, the remote vehicle RV connection maintenance system 10 prevents or prohibits the second receiver/transmitter 14 from connecting to the portable device PD.

It is noted that while this situation is discussed as receiving and sending information from the external server, the host vehicle HV can send the information directly to the remote vehicle RV in any suitable manner.

Moreover, the remote vehicle RV can request a check of whether the host vehicle HV is moving. Such a request can be direct to the host vehicle HV or through the external server 22. Thus, if the host vehicle HV is determined to be moving based on metrics received by the host vehicle HV, the remote vehicle RV can use this additional information to determine that the remote vehicle RV should not attempt to connect to the portable device PD. The remote vehicle RV can determine that the portable device PD is not connected to the remote vehicle RV, is disposed externally from the remote vehicle RV, and disposed within the moving host vehicle HV. Thus, this information can be used to further restrict attempts to connect to the portable device PD.

In some embodiments, as shown in FIG. 4, the first receiver/transmitter 12 and or any other suitable receive is configured to receive a signal from a key fob K. For example, in some vehicles, the vehicle can be started via a remote starter or the doors or hatch be opened or unlocked via the key fob K. Thus, in one embodiment, the key fob K can be associated with the remote portable device PD. In other words, when the key fob K is used to start the host vehicle HV or unlock/open the door or hatch of the host vehicle HV, the electronic controller 16 determines that a specific user with a specific portable device PD intends to operate the host vehicle HV. In some embodiments, the host vehicle HV can be started or unlocked/opened with the portable device PD itself. Thus, in these embodiments, the portable device PD is the key fob K.

In one embodiment, the controller 16 of the host vehicle HV can associate a specific key fob K with a specific portable device PD by tracking (over days or any other predetermined amount of time) which key fob K is in the host vehicle IHV when the specific portable device PD is in the host vehicle HV. Accordingly, the controller 16 of the host vehicle HV will determine based on frequency statistics which key fob K is associated with which portable device PD. In one embodiment, when the controller 16 has associated a specific key fob K with a specific portable device PD which is disposed in the host vehicle or was started by the host vehicle, the vehicle connection maintenance system 10 determines that not to disconnect the specific portable device PD automatically without asking the user to confirm the disconnection. In some embodiments, the key Fob K can be integrated into the portable device PD. Such an embodiment enables the controller 16 of the host vehicle HV to determine which key fob K started the vehicle and which portable device PD is associated therewith.

Such an instance usually occurs when the user is exterior to the host vehicle HV. In other words, the signal from the key fob K can be exterior to the vehicle. Similarly to discussed above, this information can be transmitted to the remote vehicle RV directly or through the external server 22. In this embodiment, even when the portable device PD is approached by or approaches the remote vehicle RV, the electronic controller 16 of the vehicle connection maintenance system 10 of the remote vehicle RV is configured to prevent the remote portable device PD from connecting to a system of the remote vehicle RV through the second receiver/transmitter 14.

In one embodiment, when the controller 16 of the vehicle connection maintenance system 10 determines that the user is exterior to the host vehicle HV, the controller 16 can enable the portable device PD to pair with a system of the host vehicle RV but not connect for voice communication purposes. That is, the vehicle connection maintenance system 10 will determine a user is not disposed in the passenger compartment, and thus communication through the host vehicle HV is not desired, but rather communication through the portable device is desired. Such a system also enables the user of the portable device to leave/enter the host vehicle HV passenger compartment and maintain a seamless voice communication through a combination of the vehicle communication system and the portable device PD.

In some embodiment, as shown in FIGS. 2 and 4, a sensor or detector is configured to determine if a user of the portable device is disposed within the host vehicle HV. For example, a vehicle internal determination device is disposed within the host vehicle HV is configured to determine whether a user is disposed within the host vehicle HV. The vehicle internal determination device can be a camera 32 or a seat sensor 34 or any other suitable device.

As can be understood, when the vehicle internal determination device is the camera (see e.g., FIG. 4), the camera 32 includes facial recognition software or other suitable software of hardware to determine the identity of a passenger or the camera is in communication with facial recognition software. The controller 16 based on information from the software determines that the user is associated with a specific portable device PD based on data stored in the data storage 38, and the user is disposed in the host vehicle HV. Similarly to discussed above, this information can be transmitted to the remote vehicle RV directly or through the external server 22. In this embodiment, even when the portable device PD is approached by or approaches the remote vehicle RV, the electronic controller 16 of the vehicle connection maintenance system 10 of the remote vehicle RV is configured to prevent the remote portable device PD from connecting to a system of the remote vehicle RV through the second receiver/transmitter 14.

Moreover, the camera 32 can be positioned in any suitable position to enable the controller 14 to recognize the passenger. For example, the camera can be positioned internally or externally to the passenger compartment PC to enable the controller to determine the passenger through facial recognize when he passenger is disposed within the host vehicle HV or external to the host vehicle upon an open/close door event, or when the key fob K is in a predetermined proximity status, when the host vehicle HV has been started remotely, and in any other suitable situation. Moreover, the camera can include a microphone or microphone array that is able to recognize the passenger through voice recognition software. It is noted that the microphone can be separate from the camera, or the microphone can be disposed within or on the vehicle without a camera or an association with a camera.

When the vehicle internal determination device is a seat sensor 34 or other sensor, when the sensor is activated, the controller determines an occupant is in the passenger compartment PC of the host vehicle HV. Based on this information, and in some embodiments, in combination with other information (for example, the information related to the key fob K discussed above), the controller 16 determines that the user is associated with a specific portable device PD based on data stored in the data storage 38, and the user is disposed in the host vehicle IV. Similarly to discussed above, this information can be transmitted to the remote vehicle RV directly or through the external server 22. In this embodiment, even when the portable device PD is approached by or approaches the remote vehicle RV, the electronic controller 16 of the vehicle connection maintenance system 10 of the remote vehicle RV is configured to prevent the remote portable device PD from connecting to a system of the remote vehicle RV through the second receiver/transmitter 14.

It is noted that the vehicle internal determination device can use any suitable system to detect whether the portable device PD is external or internal to the passenger compartment PC. For example, the a plurality of antennas can be used to triangulate the position of the portable device PD.

Alternatively, the signal strength on the portable device PD relative to the antennas can be used to determine the position of the portable device PD. The antennas can be any suitable antennas in deposed on the host vehicle HV and/or the remote vehicle RV or external to the host vehicle HV and/or the remote vehicle RV two-way wireless communications network.

In one embodiment, when a non-driving passenger is detected or determined to be in possession of the portable device PD paired or connected to the host vehicle, the controller 16 can determine that the portable device PD should maintain connection with the host vehicle HV, but at a lower priority than full function on the operator of the vehicle. For example, the controller can connect the audio library, but not connect the handsfree phone connection.

Figure 7:
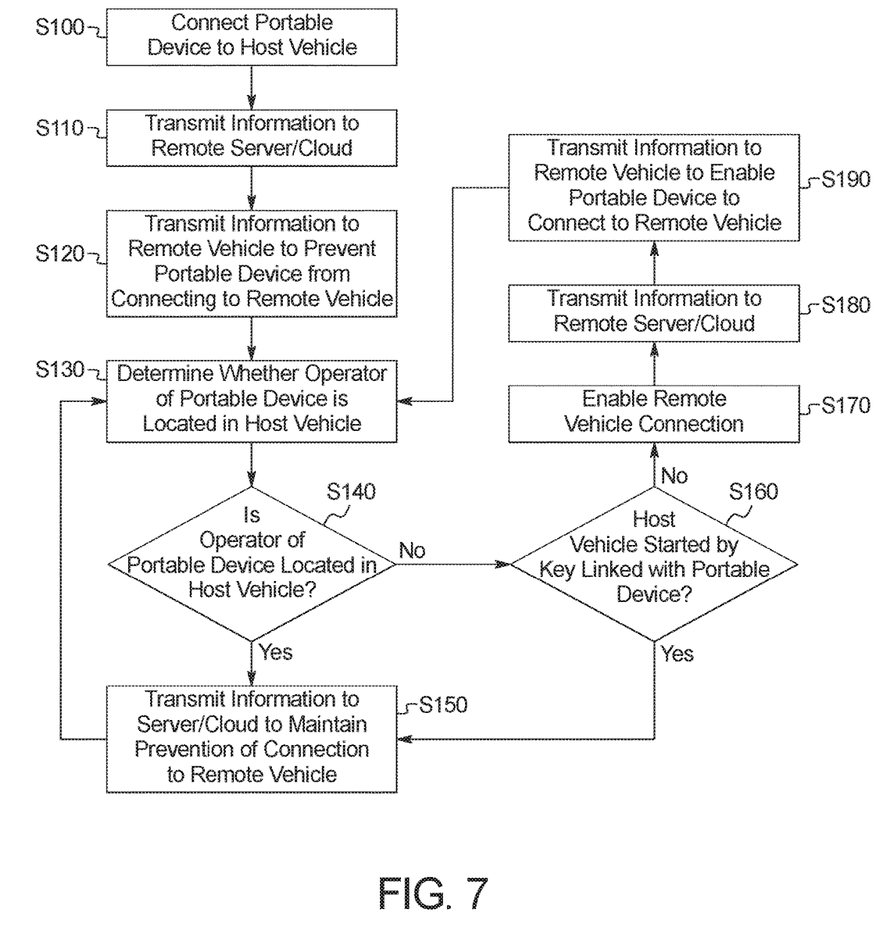
FIG. 7 is a flowchart illustrating exemplary operations a vehicle connection maintenance system for determining whether a connection between a vehicle system and a portable device is to be maintained according to disclosed embodiments.

FIG. 7 is flowchart illustrating exemplary operations a vehicle connection maintenance system 10 for determining whether a connection between a vehicle system and a portable device PD is to be maintained according to disclosed embodiments. First, in step S100, the second receiver/transmitter 14 identifies and connects to a portable device PD. This step generally is conducted with a portable device PD that has been previously connected to both the host vehicle HV and the remote vehicle RV. Moreover, the second receiver/transmitter 14 generally has a limited range and thus the portable device PD must be within the range of detection prior to becoming connected. However, the range can be beyond the passenger compartment PC of the host vehicle HV, so that the portable device PD is capable of connecting to a host vehicle HV system prior to entry into the passenger compartment PC of the host vehicle HV.

Next, in step S110, the controller 16 causes the first receiver/transmitter 12 to transmit information to the external server 22 or the cloud C. Information on the external server 22 or in the cloud C can be stored therein, such that any host or remote vehicle within the system can request a check of connection between any portable device PD. Thus, in one embodiment, the host vehicle HV and the remote vehicle RV are capable of requesting updates of portable devices PD. In some embodiments, the information includes the information that a specific portable device PD is connected to the host vehicle HV. This information is then transmitted to a remote vehicle RV or a plurality of remote vehicle RVs by a transmitter 24 in the external server 22 in step S120. In some embodiments, this information is transmitted to one or more remote vehicle RVs that are within an identified network. For example, the host vehicle HV or vehicles can be vehicles identified by a user or they can be vehicles previously connected to the remote portable device PD.

In step S140, the controller 16 determines whether the user/operator of the portable device PD is located within the host vehicle HV. This determination, as discussed herein, can be performed by a vehicle internal determination device that is disposed within the host vehicle HV and is configured to determine whether a user is disposed within the host vehicle HV. In step S140, the controller 16 determines that when the user of the portable device PD is disposed within the host vehicle HV, the information is transmitted to the external server 22, which then transmits the information to the remote vehicle RV or vehicles, such that the remote vehicle RV will maintain prevention of connection to the portable device PD in step S150. The vehicle connection maintenance system 10 will continue to monitor whether the portable device PD is located in the host vehicle HV.

If it is determined that the portable device PD is not within the passenger compartment of the host vehicle HIV in step S140, for example, when the vehicle internal determination device determines the user is not within the host vehicle HV, the controller 16 will determine, in step S160 whether the host vehicle HV was externally started by a remote starter by a key fob K linked or associated with a specific portable device PD. When the controller 16 determines that the host vehicle HV was started by a key fob K linked or associated with a specific portable device PD, this information is transmitted to the external server 22, in step S150, which then transmits the information to the remote vehicle RV or vehicles in step S150. Accordingly, the remote vehicle RV will maintain prevention of connection to the portable device PD. The vehicle connection maintenance system 10 will continue to monitor whether the portable device PD is located in the host vehicle HV. In one embodiment, the user of the portable device PD can check the connection status on the display 36 and override the connection, or be giving options to decide which vehicle to connect to.

When the controller 16 determines that the host vehicle HV was not started by a key fob K linked or associated with a specific portable device PD, the controller 16 of the host vehicle HV can enable remote vehicle RV connection in step S170. This information is transmitted to the external server 22 in step S180, which then transmits the information to the remote vehicle RV or vehicles in step S190. The remote vehicle RV or vehicles can then enable connection between the portable device PD and the remote vehicle RV. The vehicle connection maintenance system 10 will continue to monitor whether the portable device PD is located in the host vehicle HV.

As can be understood, the described vehicle connection maintenance system 10 improves connection between vehicles and portable devices.

Transmitters and receivers are conventional components that are well known in the art. Since these devices are well known in the art, these structures will not be discussed or illustrated in detail herein. Rather, it will be apparent to those skilled in the art from this disclosure that the components can be any type of structure and/or programming that can be used to carry out the present invention.

Additionally, the Bluetooth connection technology is conventional and well known in the art. Since this technology is well known in the art, the components and methodology will not be discussed or illustrated in detail herein. Rather, it will be apparent to those skilled in the art from this disclosure that the components and methodology can be any type of structure and/or programming that can be used to carry out the present invention. Moreover, it will be understood that the systems described herein are not limited to Bluetooth technology and can be used with any suitable connection (wires or wireless) connection that can be used with a portable device.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts. Accordingly, these terms, as utilized to describe the present invention should be interpreted relative to a vehicle equipped with the vehicle connection maintenance system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle connection maintenance system, comprising:
    a receiver disposed in a vehicle and configured to receive a signal from a portable device to enable the portable device to wirelessly connect to a connection system in the vehicle;
    a transmitter disposed in the vehicle and configured to transmit information related to the portable device; and
    an electronic controller disposed in a vehicle and including a processor and a control program stored on a memory, the processor using the control program to the cause the transmitter to transmit information to a remote device when the receiver has received the signal from the portable device and the portable device is wirelessly connected to the connection system of the vehicle to maintain wireless connection between the portable device and the connection system of the vehicle and prevent the portable device from wirelessly connecting to a remote system, the information indicating that the portable device is wirelessly connected to the connection system in the vehicle.

2. The vehicle connection maintenance system of claim 1, wherein
    the electronic controller is configured to cause the transmitter to transmit the information to a network.

3. The vehicle connection maintenance system of claim 1, wherein
    the electronic controller is configured to cause the transmitter to transmit the information to the remote system.

4. The vehicle connection maintenance system of claim 1, wherein
    the electronic controller is configured to prevent a remote portable device from connecting to the connection system of the vehicle when the electronic controller receives information that the remote portable device is connected to a system of the remote system.

5. The vehicle connection maintenance system of claim 1, wherein
    the receiver is configured to receive a signal from a key, and when the key is associated with a remote portable device, and the signal from the key is determined to be exterior to the vehicle, the electronic controller is configured to prevent the remote portable device from connecting to the connection system of the vehicle.

6. The vehicle connection maintenance system of claim 1, further comprising
    a vehicle internal determination device to determine whether a user is disposed within the vehicle, and the electronic controller is configured to prevent a remote portable device from connecting to the connection system of the vehicle.

7. The vehicle connection maintenance system of claim 6, wherein
    the vehicle internal determination is a camera or a microphone.

8. The vehicle connection maintenance system of claim 6, wherein
    the vehicle internal determination is a seat sensor.

9. The vehicle connection maintenance system of claim 1, wherein
    the electronic controller is configured to cause the transmitter to transmit the information to a second electronic controller in a second vehicle, the second electronic controller using pier-to-pier encryption to encrypt the information indicating the portable device is wirelessly connected to the connection system in the vehicle.

10. The vehicle connection maintenance system of claim 1, wherein
    the electronic controller is configured to cause the transmitter to transmit the information to a second portable device, the second portable device using pier-to-pier encryption to encrypt the information indicating the portable device is wirelessly connected to the connection system in the vehicle.

11. The vehicle connection maintenance system of claim 1, wherein
    the portable device is configured to transmit the information to a second portable device, the second portable device using pier-to-pier encryption to encrypt the information indicating the portable device is wirelessly connected to the connection system in the vehicle.

12. A vehicle connection maintenance system, comprising:
    an external server;
    a remote receiver connected to the external server;
    a vehicle receiver disposed in a vehicle and configured to receive a signal from a portable device to enable the portable device to wirelessly connect to a connection system in the vehicle;
    a vehicle transmitter disposed in the vehicle and configured to transmit information related to the portable device to the remote receiver; and
    an electronic controller disposed in a vehicle and including a processor and a control program stored on a memory, the processor using the control program to cause the vehicle transmitter to transmit information to the remote receiver when the vehicle receiver has received the signal from the portable device and the portable device is wirelessly connected to the connection system of the vehicle to maintain wireless connection between the portable device and the connection system of the vehicle and prevent the portable device from wirelessly connecting to a remote system, the information indicating that the portable device is connected to the connection system in the vehicle.

13. The vehicle connection maintenance system of claim 12, wherein
the server includes a remote transmitter configured to transmit the information to the remote system to prevent the portable device from connecting to a communication system in the remote system.

14. The vehicle connection maintenance system of claim 12, wherein
the electronic controller is configured to prevent a remote portable device from connecting to the connection system of the vehicle when the electronic controller receives information that the remote portable device is connected to a system of the remote system.

15. The vehicle connection maintenance system of claim 12, wherein
the vehicle receiver is configured to receive a signal from a key, and when the key is associated with a remote portable device, and the signal from the key is determined to be exterior to the vehicle, the electronic controller is configured to prevent the remote portable device from connecting to the connection system of the vehicle.

16. The vehicle connection maintenance system of claim 12, further comprising
a vehicle internal determination device to determine whether a user is disposed within the vehicle, and the electronic controller is configured to prevent a remote portable device from connecting to the connection system of the vehicle.

17. The vehicle connection maintenance system of claim 12, wherein
the vehicle internal determination is a camera or microphone.

18. The vehicle connection maintenance system of claim 12, wherein
the vehicle internal determination is a seat sensor.

* * * * *